(12) United States Patent
Hirai et al.

(10) Patent No.: US 12,079,310 B2
(45) Date of Patent: Sep. 3, 2024

(54) DEFECT CLASSIFICATION APPARATUS, METHOD AND PROGRAM

(71) Applicant: KABUSHIKI KAISHA TOSHIBA, Tokyo (JP)

(72) Inventors: Ryusuke Hirai, Tokyo (JP); Saori Asaka, Yokohama Kanagawa (JP); Yukinobu Sakata, Kawasaki Kanagawa (JP); Akiyuki Tanizawa, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 303 days.

(21) Appl. No.: 17/463,162

(22) Filed: Aug. 31, 2021

(65) Prior Publication Data

US 2022/0292317 A1 Sep. 15, 2022

(30) Foreign Application Priority Data

Mar. 11, 2021 (JP) .................. 2021-039436

(51) Int. Cl.
*G06K 9/62* (2022.01)
*G06F 18/241* (2023.01)
*G06T 7/00* (2017.01)
*G06V 10/75* (2022.01)

(52) U.S. Cl.
CPC ............ *G06F 18/241* (2023.01); *G06T 7/001* (2013.01); *G06V 10/751* (2022.01); *G06T 2207/20081* (2013.01); *G06T 2207/20224* (2013.01); *G06T 2207/30148* (2013.01)

(58) Field of Classification Search
CPC .................. G06F 18/241; G06T 7/001; G06T 2207/20081; G06T 2207/20224; G06T 2207/30148; G06T 2207/10056; G06T 2207/10116; G06T 2207/20021; G06T 7/0002; G06T 7/70; G06V 10/751; G06V 10/7625; G06V 20/52; G06N 20/00
See application file for complete search history.

(56) References Cited

U.S. PATENT DOCUMENTS

| 7,346,470 B2 * | 3/2008 | Wisniewski ............ H01L 22/20 |
| | | 702/179 |
| 7,797,068 B2 * | 9/2010 | Kyoh ........................ G03F 1/36 |
| | | 700/109 |
| 2012/0131529 A1 | 5/2012 | Hayakawa et al. |
| 2013/0343632 A1 * | 12/2013 | Urano ..................... G06T 7/001 |
| | | 382/149 |

FOREIGN PATENT DOCUMENTS

WO 2011004534 A1 1/2011

* cited by examiner

*Primary Examiner* — Mekonen T Bekele
(74) *Attorney, Agent, or Firm* — Holtz, Holtz & Volek PC

(57) ABSTRACT

According to one embodiment, a defect classification apparatus includes a processor. The processor acquires a first design image which is an image based on design data created by design software and relates to a first inspection target, and acquires a first real image which is captured by imaging the first inspection target produced based on the design data. The processor converts the first design image to a reference image represented by using a second real image captured by imaging a second inspection target without a defect. The processor calculates a reliability of the reference image. The processor detects a defect in the first inspection target by comparing the reference image and the first real image and classifies the defect, based on the reliability.

12 Claims, 7 Drawing Sheets

DEFECT CLASSIFICATION APPARATUS, METHOD AND PROGRAM

CROSS-REFERENCE TO RELATED APPLICATIONS

This application is based upon and claims the benefit of priority from Japanese Patent Application No. 2021-039436, filed Mar. 11, 2021, the entire contents of which are incorporated herein by reference.

FIELD

Embodiments described herein relate generally to a defect classification apparatus, method and program.

BACKGROUND

In a process of manufacturing a product such as a semiconductor device, based on a circuit pattern, a defect inspection is important in order to suppress a decrease in yield of products. For example, as regards a semiconductor device, there is known a defect inspection called "Die to Database inspection.", in which a photograph image (referred to as a real image) of a circuit pattern is compared with a mask image acquired by generating a photograph image from the circuit pattern in a pseudo-manner. In this inspection, two images are simply compared, and, since this inspection is theoretically simple, this inspection is implemented in various inspection apparatuses.

In addition, in the defect inspection, it is advantageous to determine defects by classifying the defects into, for example, a defect to be corrected, a defect which does not affect the operation of a semiconductor device after transfer, and a pseudo-defect. In general, since classification by the naked eye involves a great variance in precision due to the skill of persons who evaluate, and since classification by the naked eye is time-consuming, various automated methods relating to the classification of defects have been proposed.

For example, there is known a method in which a region where a difference between a target image and a reference image is great is superimposed on design data, and a defect that depends on a design layout is classified. It is presupposed that the reference image, which is used, reproduces with fidelity the photograph image of the mask which is free from a defect. Thus, if the reproducibility of the reference image is low, the above-described difference increases, and it is not possible to adapt to a case in which a defect is erroneously detected.

DETAILED DESCRIPTION

In general, according to one embodiment, a defect classification apparatus includes a processor. The processor acquires a first design image which is an image based on design data created by design software and relates to a first inspection target. The processor acquires a first real image which s captured by imaging the first inspection target produced based on the design data. The processor converts the first design image to a reference image represented by using a second real image captured by imaging a second inspection target without a defect. The processor calculates a reliability of the reference image. The processor detects a defect in the first inspection target by comparing the reference image and the first real image. The processor classifies the defect, based on the reliability.

Hereinafter, a defect classification apparatus, method and program according to embodiments will be described with reference to the accompanying drawings. Note that in the embodiments below, parts denoted by identical reference signs are assumed to perform similar operations, and an overlapping description is omitted unless where necessary.

Figure 1:
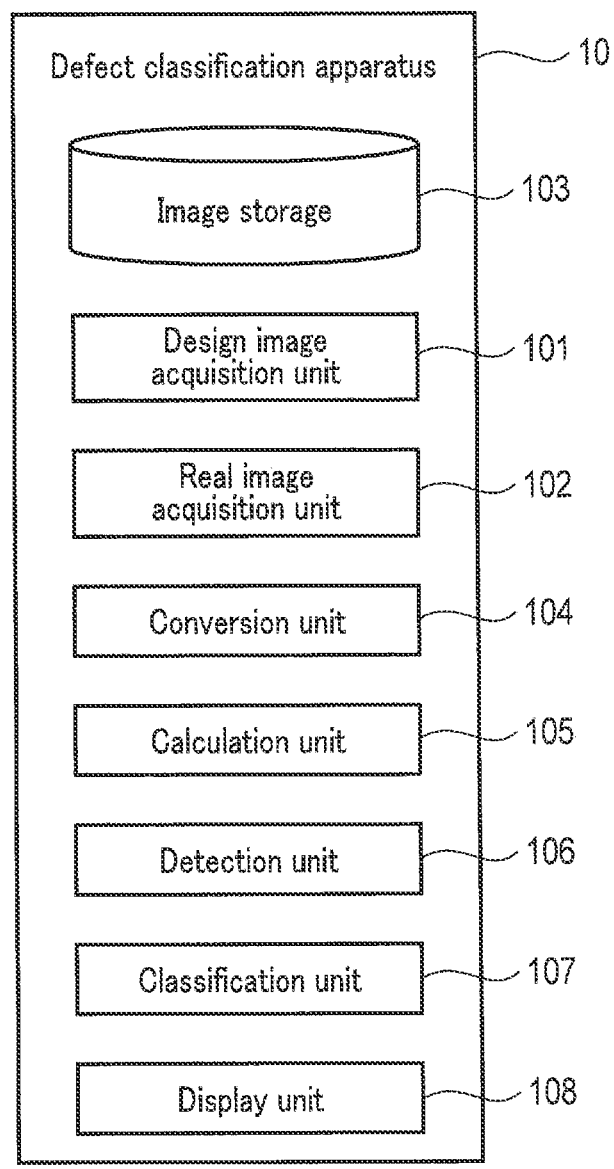
FIG. 1 is a block diagram illustrating a defect classification apparatus according to an embodiment.

A defect classification apparatus according to an embodiment will be described with reference to a block diagram of FIG. 1.

A defect classification apparatus 10 according to the embodiment includes a design image acquisition unit 101, a real image acquisition unit 102, an image storage 103, a conversion unit 104, a calculation unit 105, a detection unit 106, a classification unit 107, and a display unit 108.

The design image acquisition unit 101 acquires a first design image which is based on design data generated by design software and relates to an inspection target. (first inspection target) that is an object of an inspection. The design software is, for example, software for computer design, such as a CAD (Computer Aided Design) in the design, design data is created through steps such as a function design which implements required functions, a logic design which creates a circuit diagram, and a physical design which implements an arrangement and a wiring layout of elements. For example, as in the Die to Database inspection, the first design image is a binary image corresponding to the presence/absence of a pattern of design data. Besides, the first design image may be an image based on a pattern of design data.

The real image acquisition unit 102 acquires a first photograph image (referred to as a first real image) which is captured by imaging an inspection target which was actually produced based on the design data of the inspection target. An imaging apparatus, which is used, is, for example, an optical camera. Alternatively, the imaging apparatus may be a general electron microscope or X-ray imaging camera, or various cameras which are theoretically similar to the general electron microscope or X-ray imaging camera. Specifically, light (electromagnetic wave) is scan-radiated from a light source onto a subject that is an inspection target, and the light (electromagnetic wave), which is transmitted or reflected, is converted to pixel values in accordance with the intensity or the like of the light (electromagnetic wave) at the time when the light (electromagnetic wave) has reached a sensor. Thereby, an image of the subject is formed. The light source in this case is, for example, a DUV (Deep Ultraviolet)

laser. In addition, as the sensor, use is made of a sensor in which sensors are arranged in a two-dimensional array, like a CMOS sensor. It assumed that, as regards the light source or sensor, the wavelength of light thereof or the arrangement of the sensor array is appropriately determined in accordance with the fineness of the pattern of the inspection target.

The image storage 103 collects an image pair between a second design image and a second photograph image (referred to as a second real age) corresponding to the second design image, and stores the collected image pairs as a database. The second design image is a design image based on design data relating to an inspection target (second inspection target) which is different from the above-described inspection target and was previously inspected. The second real image is a photograph image of an inspect on target with no defect (also referred to as "good product" or "normal product"), the second real image being generated based on design data relating to the second design image. The phrase "with no defect" means that a real image is determined to have no defect, for example, by the naked eye or by some other external appearance inspection system.

It is preferable that the second real image included in the image pair is an image captured by the same structure as an imaging system used when the first real image of the inspection target is acquired. However, the image pair may be acquired by some other imaging system. In addition, it is preferable that the image pair have an identical resolution, but the images that form the image pair may have different resolutions.

The image pairs may be classified according to information of the creation of images such as information of the imaging system relating to the acquisition of the images, information of the resolution of the images, and information categorized according to the pattern of design data. A set of image pairs classified according to categories is also called "image pair class". The pattern of design data in this case indicates geometrical information such as the length of a straight line or the curvature of a curve, or information of the type of a designed circuit, for example, an analog circuit such as an RF circuit, or a digital circuit such as a logical operation circuit.

The conversion unit 104 receives the first design image from the design image acquisition unit 101. Referring to the image pairs in the image storage 103, the conversion unit 104 converts the first design image to a reference image which is represented by using the second real image so as to reproduce a real image with no defect, which relates to the first design image. In other words, the conversion unit 104 generates, based on the first design image, a reference image which becomes a pseudo-real image of the inspection target in a case in which the inspection target has no defect. The reference image becomes, for example, a mask image used for a defect inspection.

The calculation unit 105 calculates the reliability on the reproducibility of the reference image, with respect to the reference image generated by the conversion unit 104.

The detection unit 106 receives the reference image from the conversion unit 104, and receives the first real image from the real image acquisition unit 102. The detection unit 106 compares the reference image and the first real image, and determines whether a defect is present in the inspection target. Further, when a defect is present in the inspection target, the detection unit 106 detects the position of the defect (hereinafter, also referred to as "defect position") in the first real image.

The classification unit 107 receives the reference image from the conversion unit 104, receives the reliability from the calculation unit 105, and receives the first real image and the information relating to the defect position from the detection unit 106. The classification unit 107 classifies the defect at the defect position, and obtains a classification result. Classifications of the defect include, for example, a defect to be corrected (a line-width defect, a hole defect), a defect causing no problem in operation of a circuit, and a pseudo-defect due to erroneous detection of a good product (normal product).

The display unit 108 receives the first real image, the defect position and the classification result from the classification unit 107, and displays them, for example, on a display with which the defect classification apparatus 10 is equipped. In addition, aside from the displaying, the display unit 108 may output to the outside the data of the first real image, the defect position and the classification result of the defect. For example, the display unit 108 may transmit the data of the first real image, the defect position and the classification result of the defect to an external device with a screen display function, such as a tablet terminal or a smartphone.

Note that the defect classification apparatus. 10 according to the embodiment includes the image storage 103, but the image storage 103 may exist outside the defect classification apparatus 10, for example, as an external server that is connectable to the defect classification apparatus 10.

Figure 2:
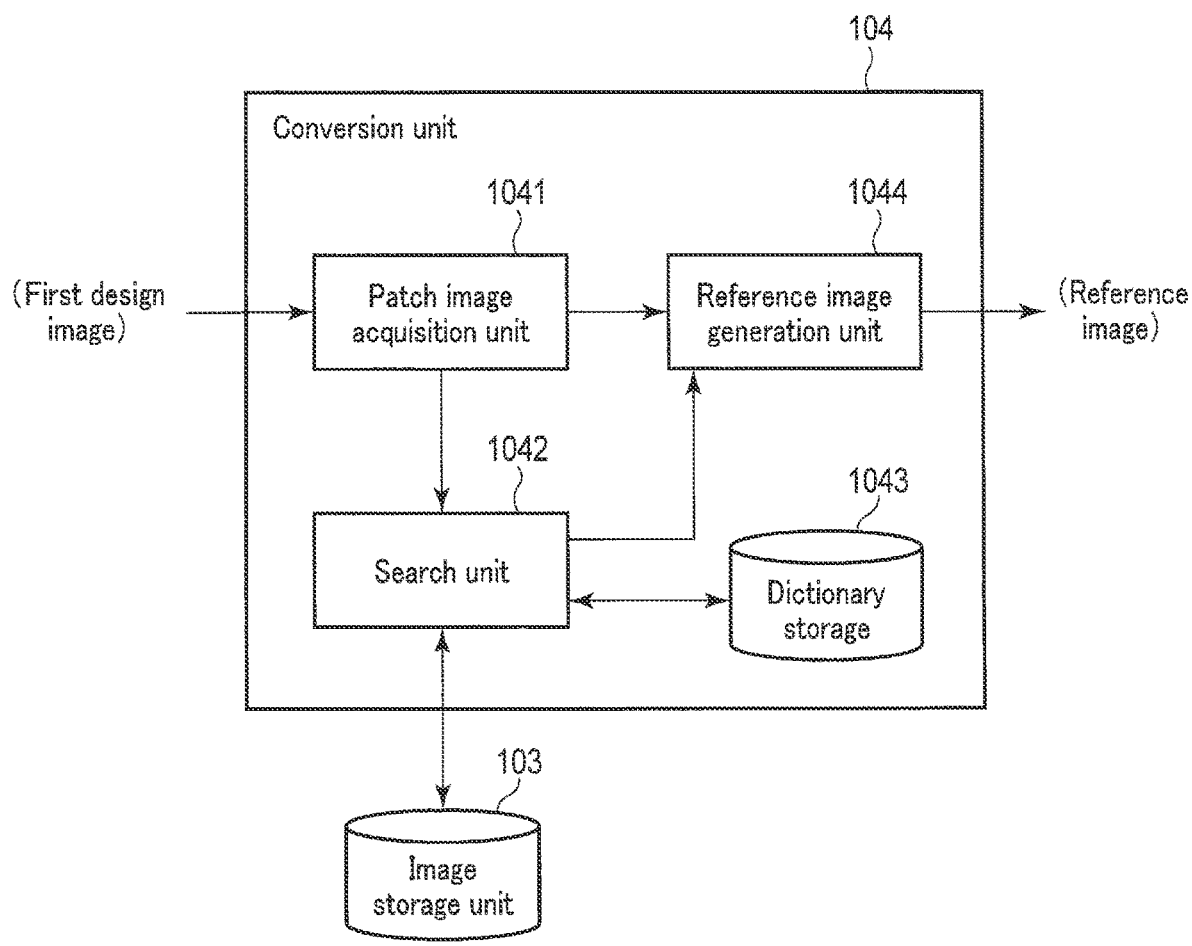
FIG. 2 is a block diagram illustrating details of a conversion unit.

Next, the details of the conversion unit 104 will be described with reference to a block diagram of FIG. 2.

The conversion unit 104 includes a patch image acquisition unit 1041, a search unit 1042, a dictionary storage 1043, and a reference image generation unit 1044.

The patch image acquisition unit 1041 receives the first design image from the design image acquisition unit 101, and cuts out a partial image from the first design image. Hereinafter, the cut-out partial image is referred to as "first design patch image". In a method of cutting out the first design patch image, the first design patch image may be generated by setting a plurality of sampling points on the acquired first design image, and cutting out a partial image of a predetermined size around the sampling points.

The search unit 1042 acquires a plurality of image pairs from the image storage 103, extracts a second design patch image from the second design image, and a second real patch image from the second real image, by associating the second design patch image with the second real patch image, and stores the extracted second design patch image and second real patch image as a dictionary in the dictionary storage 1043. In a method of acquiring the plurality of image pairs from the image storage 103, for example, all image pairs included in the image storage 103 may be acquired, or image pairs may be acquired at random. Further, when there are a plurality of image pair classes, the same number of image pairs may be acquired at random from each of the image pair classes, or image pairs may be acquired from only one image pair class.

The second design patch image is a partial image which is cut out from the second design image, and the second real patch image is a partial image which is cut out from the second real image. The number of partial images that are cut out may be set as appropriate, in accordance with the storage capacity which can be held by the dictionary storage 1043, In addition, it is assumed that the cut-out position is an identical position on the subject between the second design patch image and the second real patch image.

The search unit 1042 receives the first design patch image from the patch image acquisition unit 1041, searches the second design patch image which is similar to the first design patch image by referring to the dictionary storage 1043, and extracts the second real patch image which is paired with the similar second design patch image. The similarity in the case of searching the second design patch image, which is similar to the first design patch image, may be any index by which a distance between vectors can be calculated. For example, a sequence of pixel values of the first design patch image may be regarded as a vector, and the calculation may be performed by using an L1 norm or L2 norm of a difference from a vector of pixel values of the second design patch image. Alternatively, a normalized cross-correlation value may be as the similarity. Specifically, pattern matching, such as SSD (Sum of Squared Difference) or SAD (Sum of Absolute Difference), relating to a difference between pixel values of the first design patch image and the second design patch image, may be adopted, and any method may be used if the method calculates the similarity between images. The search unit 1042 may extract the calculated similarity and the second real patch image from the dictionary storage 1043.

Note that the search unit 1042 is assumed to generate a dictionary relating to patch images and to store the dictionary in the dictionary storage 1043, before searching the second design patch image similar to the first design patch image, but the embodiment is not limited to this. For example, a dictionary may be periodically generated from the image storage 103, and the dictionary may be stored in the dictionary storage 1043. Alternatively, each time a new image pair is stored in the image storage 103, a dictionary relating to patch images may be generated from the new image pair, and a set of patch images may be stored in the dictionary storage 1043.

The dictionary storage 1043 receives a plurality of pairs of second design patch images and second real patch images from the search unit 1043, and stores the pairs as the dictionary.

The reference image generation unit 1044 receives the first design image from the patch image acquisition unit 1041 or the search unit 1042, and receives the second real patch image from the search unit 1042. The reference image generation unit 1044 allocates the second real patch image to the cut-out position of the first design patch image from the first design image. The reference image generation unit 1044 generates a reference image by allocating the searched second patch image to the cut-out position of each first patch image of the first design image.

Note that the arrangement of sampling points in the patch image acquisition unit 1041 is assumed such that all pixels of the first design image are cut out, at least once, as patch images. Accordingly, when the sampling points are densely arranged, the number of times of cut-out of partial ages as patch images increases. As a result, the number of second real patch images, which are pasted, increases. Thus, in the reference image generation unit 1044, since the number of keys increases when generating the reference image, the image quality of the reference image can be improved. On the other hand, since the number of times processing (the number of times of inquiry) for extracting the second real patch images by the search unit 1042 increases due to the dense arrangement of sampling points, the calculation amount increases. Thus, the number of sampling points may be set in consideration of the trade-off between the image quality of the reference image and the calculation amount.

Note that, ay regards an image area in which no pattern is present in the first design image, the sampling points may be non-densely set, and the number of sampling points may be reduced. In addition, if a cut-out second design patch image is identical to a second design patch image which is already registered in the dictionary storage 1043, the conversion unit 104 may delete, without newly registering, the second real patch image corresponding to the cut-out second design patch image, or may generate an average image between the second real patch image corresponding to the cut-out second design patch image and the already registered second real patch image, and may register the average image instead of the already registered second real patch image.

Alternatively, the second design patch image may be paired with a plurality of corresponding second real patch images, and the pairs may be stored in the dictionary storage 1043, and, for example, the display unit 108 may display, and may prompt the user to select, the second design patch image and the plurality of second real patch images.

When cut-out positions of second design patch images are close to each other, there is a high possibility that images at the same position are cut out overlappingly. Thus, the dictionary storage 1043 may store, as well as storing the patch images, the image pair between the second design image and the second real image, and the position information relating to the cut-out positions on the second design image and the second real image. The position information may be, for example, center coordinates of the cut-out position and a patch size, or may be a set of upper-left coordinates and lower-right coordinates of the cut-out patch image. The search unit 1042 may cut out patch images from the second design image and the second real image, based on the position information, and may execute image matching.

In addition, vector data, which is obtained by decreasing the dimensions of at least one of the second design patch image and the second real patch image, may be held. For example, a principal component analysis (PCA) may be executed for at least one of the second design patch image and the second real patch image, and vector data of the patch image represented by only a main component of a predetermined contribution ratio may be held. Thereby, the necessary storage capacity of the dictionary can be reduced.

In addition, by using a general clustering method, the second design patch images and second real patch images, which are stored in the dictionary storage 1043, may be clustered the clustering method, for example, a K-means method may be used. Alternatively, classification into many classes may be made by using a hierarchical representation such as a tree structure.

Next, referring to FIG. 3, a description will be given of a conceptual diagram in a case where patch images stored in the dictionary storage 1043 are held in a tree structure.

Figure 3:
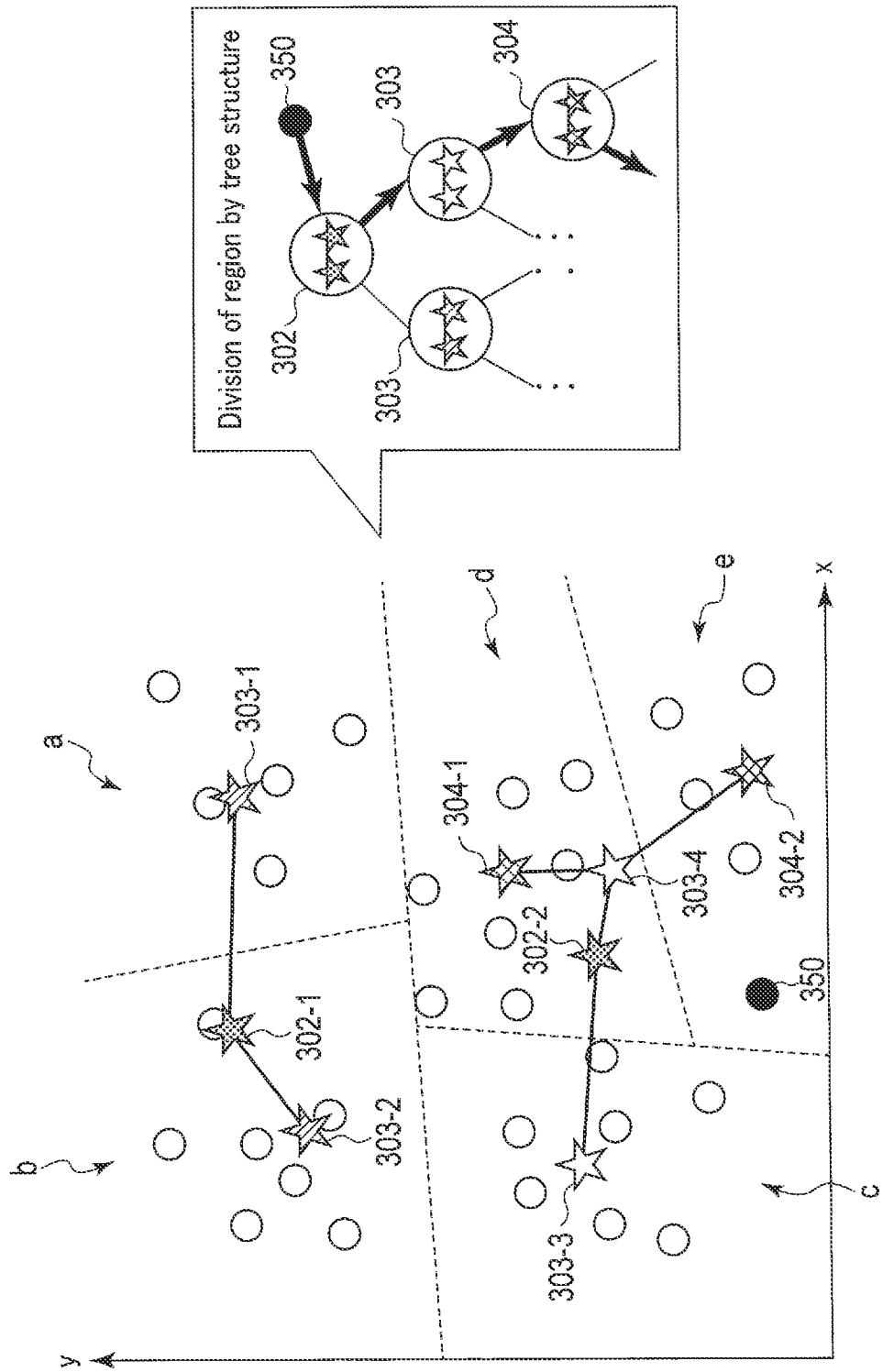
FIG. 3 is a conceptual view in a case where a dictionary stored in a dictionary storage is held with a tree structure.

FIG. 3 is a plot diagram in which second design patch images included in the dictionary are plotted, and are classified by two axes, i.e. an x axis and a y axis, by patterns. As the distance between plots is closer, it is indicated that the second design patch images are more similar. In FIG. 3, the second design patch images are clustered according to the similarity of patterns, and the second design patch images are divided into a plurality of classes which are divided by broken lines and coordinate axes. An example is illustrated in which the respective classes are associated by the tree structure, and thereby the dictionary is held by the tree structure.

In each class, a representative point is found. The representative point is an image indicating a pattern representing a plurality of second design patch images included in the class. The representative point may be one image selected from the second design patch images included in the class, or a newly computed image, such as an average image of the second design patch image. Using the respective representative points as nodes, the tree structure is formed.

Concretely, in the example of FIG. 3, a representative point 302-1 of classes a and b, and a representative point 302-2 of classes c and d are formed as nodes of an identical layer. As a lower layer of the representative point 302-1, a representative point 303-1 of the class a and a representative point 303-2 of the class b are formed as nodes in an identical layer. Similarly, as a lower layer of the representative point 302-2, a representative point 303-3 of the class c and a representative point 303-4 of the classes d and e are formed as nodes in an identical layer. Further, as a lower layer of the representative point 303-4, a representative point 304-1 of the class d and a representative point 304-2 of the class e are formed as nodes in an identical layer.

Here, a description will be given of an example in which the search unit 1042 searches a second design patch image similar to a first design patch image, based on the tree structure.

The search unit 1042 compares a first design patch image 350 and representative points which form nodes of the tree structure, and successively searches the nodes of similar patterns toward the lower layer. Specifically, in the example of FIG. 3, the search unit 1042 compares, in regard to similarity, the first design patch image 350 and two representative points 302-1 and 302-2 of the uppermost layer of the tree structure, and calculates, for example, a distance between the images. Here, a case is assumed in which the representative point 302-2 is loser in distance (i.e. more similar) to the first design patch image 350. The search unit 1042 calculates the distance between the first design patch image 350 and the lower layer (representative points 303-3 and 303-4) of the representative point 302-2. Here, assuming a case in which the first design patch image 350 is closer in distance to the representative point 303-4, the search unit 1042 similarly calculates the distance between the first design patch image 350 and the lower layer (representative points 304-1 and 304-2) of the representative point 302-4. If it is finally assumed that the first design patch image 350 is close in distance to the representative point 304-2, the search 1042 may execute a distance calculation between the first design patch image 350 and only the second design patch image included in the class e of the representative point 304-2.

According to the tree structure illustrated in FIG. 3, when the search unit 1042 searches the second design patch image that is similar to the first design patch image, the search unit 1042 successively searches from the upper layer to the lower layer of the tree structure with respect to second design patch images having similar patterns. Thereby, the number of times of search (distance calculation) can be reduced, compared to the case of searching all second design patch images included in the dictionary. This is more advantageous as the number of data stored in the dictionary is larger, and the search time can be reduced and the search efficiency can be improved.

Note that, in the stage of constructing the tree structure or in the stage of updating the tree structure, it suffices that there is one pair of identical node images, i.e. overlapping node images. Thus, a plurality of node images (second design patch images and corresponding second real patch images) having a threshold or more of the similarity of images) may be deleted. In addition, a leveling process may be executed for the node images. For example in the stage of constructing the tree structure or in the stage of updating the tree structure, there may be a case where the luminance or the like of the second real patch image varies, since the second design patch image that is the rode is the identical image, while the corresponding second real patch image is an actually photographed image. Thus, the number of node images having a threshold or more of the similarity of images is set to one, and a plurality of second real patch images, which are associated with the second design patch image that is the node image, are averaged, and thereby the number of overlapping redundant node images can be reduced and the data size of the dictionary can be reduced.

Note that, in the example of FIG. 3 the tree structure is assumed to be based on the similarity of pattern shapes (irregularities, a curvature relating to a distinction between a straight line or curved line, or the like) of the inspection target included in the second design patch images. Alternatively, a tree structure may be constructed with reference to other similarity indices such as a distribution of luminance values, and the tree structure may be held as a dictionary.

In addition, in the example of FIG. 3, the similarity to the representative points of the class is used for the branching of the nodes of the tree structure. However, any rule can be used if the rule can determine which of the classes the first design patch image 350 belongs to. For example, a hyperplane that divides a region can be used. In this case, a similar process can be executed if a hyperplane is stored at each node in place of the presentative point.

Besides, there is a method of enhancing the efficiency of the search without using the tree structure. For example, representative points (303-1, 303-2, 304-1 and 304-2) of the smallest region in FIG. 3 are stored, and, at the time of the search, the class, to which the first design patch image that is the search image, belongs, can be specified by calculating the distance between the first design patch image 350 and the respective representative points.

By the above-described method in the dictionary storage 1043, the calculation time for searching the second design patch image similar to the first design patch image can be decreased.

Note that the dictionary storage 1043 may store different dictionaries according to the type of image pairs acquired from the image storage 103. For example, different dictionaries may be stored in accordance with minimum line widths or minimum feature dimensions which are set at the time of circuit design.

Note that, in the embodiment, it is assumed that the dictionary storage 1043 is included in the conversion unit 104. Aside from this, the dictionary storage 1043 may be present in the defect classification apparatus 10. Besides, the dictionary storage 1043 may be present outside the defect classification apparatus 10. When the conversion unit 104 generates the reference image, the conversion unit 104 may access the dictionary storage 1043 which is present on the outside. Alternatively, the dictionary may be stored in the image storage 103.

Note that, in this example, the shape of each patch image is assumed to be a square. Aside from this, the shape may be some other quadrangle such as a trapezoid or a parallelogram, or a polygon of a triangle, or a pentagon, or a polygon of more angles. Alternatively, the shape may be a circle, a cruciform, or any other form. For example, the shape of the patch image may be determined as appropriate, in accordance with the circuit pattern of the inspection target, such as a circuit pattern with many straight lines or many curves.

In addition, the size of the patch image is not limited to a fixed size, and may be set to a plurality of sizes. For example, in accordance with the minimum line width or minimum feature dimension which was set at the time of circuit design, the size of the patch image may be set so as to become smaller as the pattern becomes finer.

Next, examples of pasting of the second real patch image will be described with reference to FIG. 4 and FIG.

Figure 4:
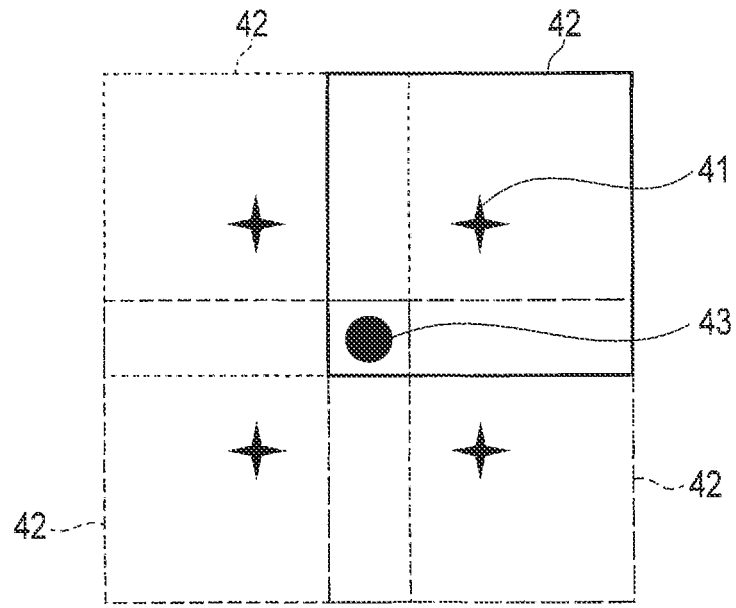
FIG. 4 is a view illustrating an example of pasting of a second real patch image.

FIG. 4 illustrates four sampling points 41, four second real patch images 42 corresponding to the sampling points 41, and a generation pixel 43 that becomes a pixel value of the reference image.

One second real patch image 42 corresponds to each of the four sampling points 41, Thus, an average value of pixel values of the second real patch images 42, which overlap the position of the generation pixel 43, is set as the pixel value of the generation pixel 43 in addition, when the similarity is associated with each of the second real patch images 42, the similarity may be used as a weight, and a weighted average of the pixel values of the second real patch images 42 may be set as the pixel value of the generation pixel 43.

Figure 5:
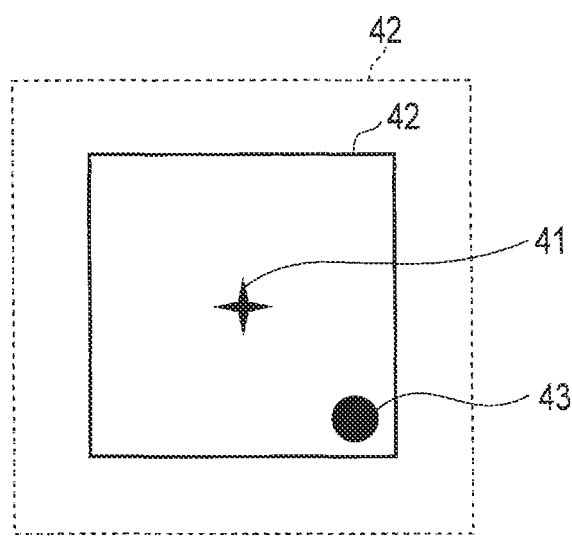
FIG. 5 is a view illustrating another example of pasting of the second real patch image.

In addition, FIG. 5 illustrates a case in which one sampling point 41 corresponds to two second real patch images 42. As illustrated in FIG. 5, when two second real patch images 42 with different sizes overlap while commonly sharing the sampling point 41, the pixel value of the generation pixel 43 may be calculated by the same method as in FIG. 4. Furthermore, when the larger second real patch image 42 is pasted, it is considered that the larger second real patch image 42 has a high similarity as the partial image of the reference image. Thus, such a weighted average as to increase the weight of the larger second real patch image 42 may be set as the pixel value of the generation pixel 43.

Note that when the second real patch image is pasted, the second real patch image may be pasted with a sub ixel precision. The reason for this is that there is a case in which the phase of the image is different between the first design patch image and the second design patch image, and there is a case in which correspondence with higher precision is achieved by using a position slightly displaced from the cut-out position itself of the first design patch image, i.e. by adjusting the position by a sub-pixel unit, rather than by a pixel unit. Thus, the reference image generation unit 1044 may align the second design patch image with the cut-out position of the first design patch image with the sub-pixel precision, and may determine the optimal pasting position.

Figure 6:
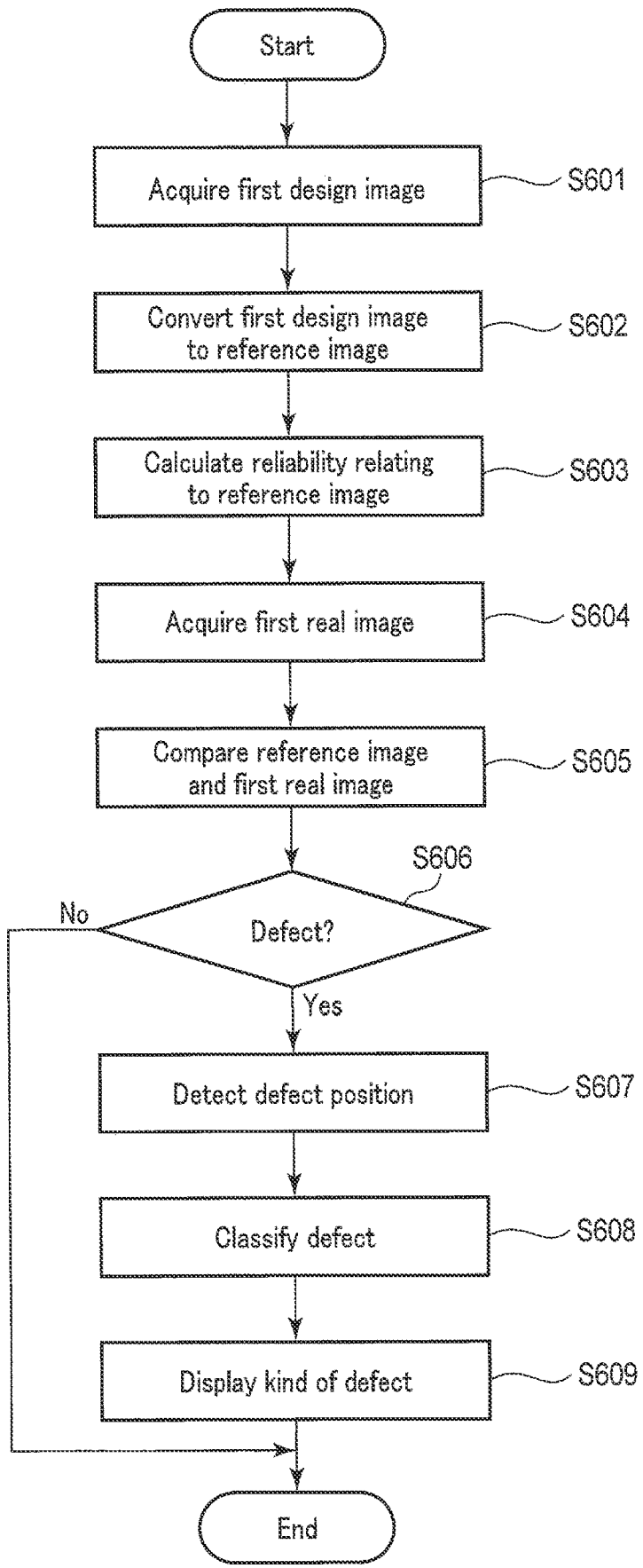
FIG. 6 is a flowchart illustrating an operation example of the defect classification apparatus according to the present embodiment.

Next, an operation example of the defect classification apparatus 10 according to the embodiment will be described with reference to a flowchart of FIG. 6.

In step S601, the design image acquisition unit 101 acquires a first design image.

In step S602, the conversion unit. 104 generates a reference image from the first design image by the above-described method.

In step S603, the calculation unit calculates the reliability of the reference image. The reliability is calculated, for example, in units of a pixel of the reference image, based on the similarity at the time of generating the reference image. In the process of generating the reference image, the similarity between the first design patch image and the second design patch image is calculated. As the similarity is lower, this indicates a higher possibility that desired data corresponding to the first design patch image is not present in the dictionary stored in the dictionary storage 1043. Thus, it can be said that the pixel value of the reference image, which is generated from the second real patch image corresponding to the second design patch image with the lower similarity, has a lower reliability.

On the other hand, as the similarity is higher, it can be said that the pixel value of the reference image, which is generated from the second real patch image corresponding to the second design patch image with the higher similarity, has a higher reliability. Thus, in the calculation of one pixel value in the reference image, when a plurality of second real patch images are used, the reliability may be calculated based on a statistic, such as an average or a variance of similarities of the second real patch images, a maximum value or a minimum value of the similarities, or a combination of two or more of these values.

In step S604, the real image acquisition unit 102 acquires a first real image.

In step S605, the detection unit 106 compares the first real image and the reference image. Specifically, the detection unit 106 calculates a difference between the pixel value of the first real image and the pixel value of the reference image with respect to each pixel at the same position. Note that the difference may be calculated after smoothing at least one of the first real image and the reference image by an averaging filter or the like. The difference may be calculated by sharpening at least one of the first real image and the reference image by an edge emphasis filter or the like.

Note that adjustment of the dynamic range may be executed for both of the first real image and the reference image. For example, the first real image and the reference image may be compared after eliminating a difference due to a difference (DC component) of average values between two images, by subtracting an average value of pixel values of the entirety of the combined first real image and reference image. Besides, the comparison may be performed after normalizing each image. Furthermore, the difference may be expressed by a correlation value. For example, the entirety or a part of an image may be cut out, and a normalized cross-correlation or the like between the cut-out partial images may be calculated. As the normalized cross-correlation value is higher, it can be said that the difference between images is smaller.

In step S606, the detection unit 106 determines the presence or absence of a defect. Specifically, the detection unit 106 determines whether the difference calculated in step 6605 is a threshold or more. When the difference is the threshold or more, the detection unit 106 determines that a defect is present, and the process advances to step S607. When the difference is less than the threshold, the detection unit 106 determines that a defect is absent, and the process is terminated.

In step S607, the detection unit 106 detects a defect position. Specifically, the detection unit 106 may estimate the pixel position, at which the presence of the defect was determined in step S606, to be the defect Position.

In step S608, the classification unit 107 classifies the defect at the defect position, and outputs information indicative of the type of the defect. For example, the classification unit 107 classifies the defect by using a discrimination device. The discrimination device includes a trained model in which a machine learning model is trained by using, as input data, the first real image including the defect, the reference image, the reliability of the reference image, and the defect position, and by using the type of the defect as correct answer data. The classification unit 107 inputs the first real image, the defect position and the reliability to the trained model, and thereby the type of the defect at the defect position is outputs the machine learning model, use may be made of a support vector machine, a random forest, deep learning, or the like.

Note that the discrimination device outputs, as a classification result, the type of defect with a highest degree of certainty among a plurality of types of defect. Note that the degree of certainty of each of the types of defect may be output as a classification result. For example, as regards data with a maximum value of a probability value, which is lower than a predetermined threshold, the probability value of each type may be presented to the user, without specifying the type of defect.

Note that the classification device 107 may classify the defect on a rule base, in accordance with the reliability of the reference image, aside from the classification of the defect with use of the discrimination device including the trained model.

In step S609, the display unit 108 presents the type of the detected defect to the user. Further, the display unit 108 may also present the defect position to the user. For example, the display unit 108 may display the defect positon in the first real image or the reference image by superimposing the defect position on the image, or may display the reliability of the reference image at the defect position. The display unit 108 may display the reliability at the position corresponding to the defect position in the first real image in a superimposed manner. In the case of the superimposed display, the reliability may be displayed by color-coding by a heatmap, or may display information which can identify the reference image in which the defect is detected, for example, by the ID of the reference image. Besides, when the defect is not detected, the user may be notified of the absence of anomaly (normal product).

Note that when the trained model used in the classification unit 107 is trained, the machine learning model is trained by using, as input data, the first real image, the defect position, the reference image with the reliability of the threshold or more, and the corresponding reliability, and using the type of the defect at the defect position as the correct answer data. An inspection result by the reference image with low reliability; may possibly adversely affect the machine learning result. Thus, by excluding this inspection result from the training data, the precision of the machine learning can be improved.

Alternatively, the reference image with low reliability may be used as input data. In this case, by such training that importance is placed on the value of reliability, training may be executed such that the weight of the classification result by the reference image with low reliability is lowered, and the weight of the classification result by the reference image with high reliability is increased.

At the time of training the trained model, the training is performed with the data in which the input data and the correct answer data are prepared in advance. At the time of the inference of the trained model, in the classification of the defect of the inspection target, if the image pattern of the type of defect, which is prepared in advance, is similar to the defect, it is expected that the precision (accuracy) of classification is high. However, even in the case of a defect of the same type, if the defect occurs in a new image pattern, there is a possibility that the (accuracy) lowers. Thus, when the probability of the classification result, which is output from the classification unit 107, is the threshold or more, the first real image, the reference image and the reliability, which are input to the trained model, may be added as training data, and may be applied to the training of the machine learning model.

Besides, at the time of training the trained model, circuit shape information at the defect position may be added as input data. The circuit shape information is, for example, information such as a width of a wiring line, corner portion of a wiring line, a shape of a broken line. When the circuit shape information is used as input data at the time of training, the circuit shape information at the defect position of the first real image may be input at a time of inference of the trained model.

Next, referring to FIG. 7, a first example of a classification result of a defect in the classification unit 107 will be described.

Figure 7:
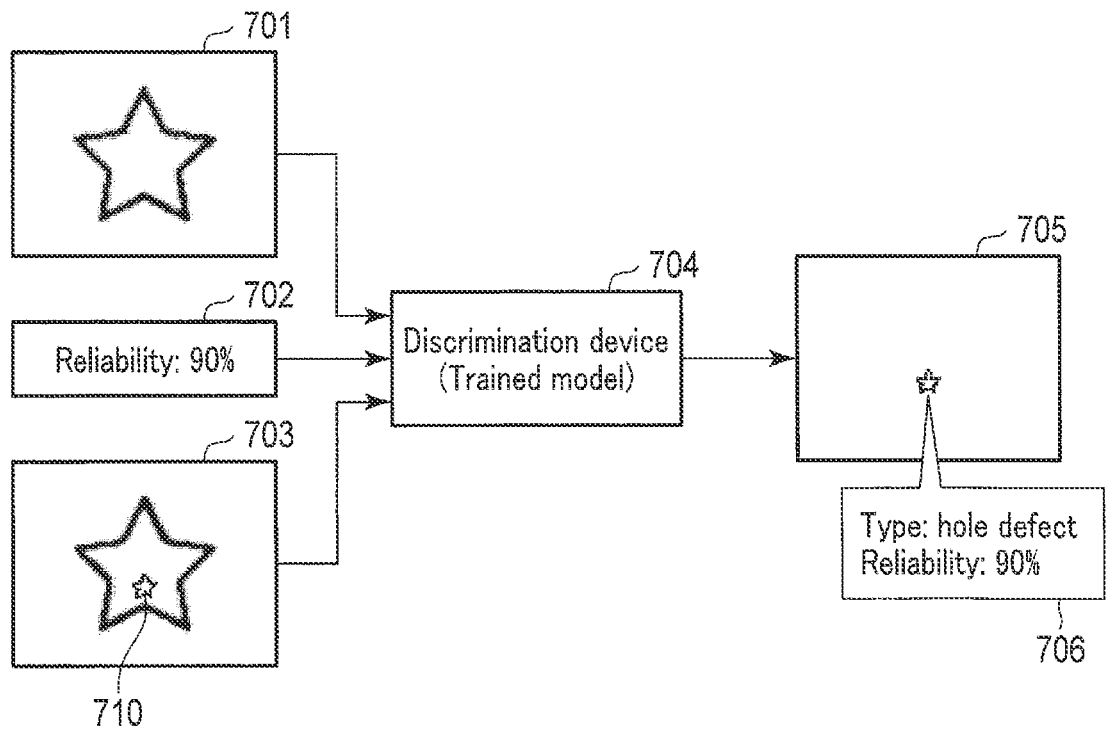
FIG. 7 is a view illustrating a first example of a classification result of a defect in a classification unit.

FIG. 7 illustrates an input and an output of a discrimination device (trained model) included in the classification unit 107. A reference image 701, a reliability 702 of the reference image 701, and a first real image 703 are input to a discrimination device 704.

In the example of FIG. 7, it is assumed that t reliability 702 of the reference image 701 is 90%. In addition, a case is assumed in which a defect 710 is present in an inspection target, the defect. 710 appears in the first real image 703.

The discrimination device 704 classifies the defect, based on the inputs of the reference image 701, reliability 702 and first real image 703, and outputs a result indicative of the type of the defect. In one example, an image 705 indicative of the position of the defect 710, and defect information 706 relating to the type of the defect 710 are presented. The image 705 indicative of the position of the defect. 710 is, for example, a difference image between the reference image 701 and the first real image 703. The defect information 706 displays the type of the defect 710, and the reliability 702. Concretely, in the example of FIG. 7, "Type: hole defect, Reliability: 90%" is displayed. Note that the reliability 702 may not be displayed in the defect information 706.

Next, referring to FIG. 8, a second example of a classification result of a defect in the classification unit. 107 will be described.

Figure 8:
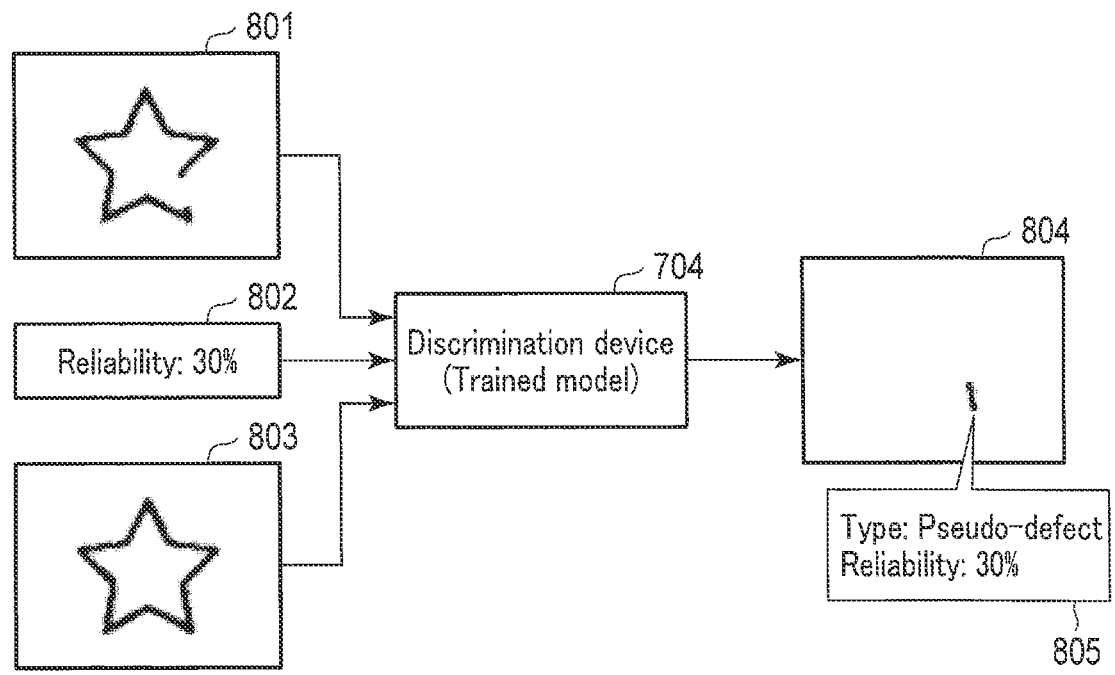
FIG. 8 is a view illustrating a second example of a classification result of a defect in the classification unit.

FIG. 8 illustrates an input and an output, which are similar to the input and output in FIG. 7, to and from the discrimination device 704, but a reliability 802 of a reference image 801 is different. In the case of FIG. 8, it is assumed that the reliability is 30%, and is relatively low.

The reference image 801, the reliability 802, and a first real image 803 are input to the discrimination device 704, and an image 804 indicative of the position of a defect, and defect information 805 are output from the discrimination device 704.

The image 804 indicative of the position of a defect illustrates a difference between the reference image 801 and the first real image 803, and a missing portion in the reference image 801 appears as a defect in the image 804. The discrimination device 704 takes into account the fact that the reliability 802 of the reference image 801 is low. Thus, it is determined that there is a high possibility that the defect based on the reference image 801 is inaccurate, and "Type: Pseudo-defect, Reliability: 30%" is displayed in the defect information 805.

Note that, in the embodiment, the inspection in the circuit design, such as semiconductor design, is assumed, but the embodiment is not limited to this. For example, the first inspection target may be a building. In this case, the first design image is based on three-dimensional design data relating the building. Specifically, the defect classification apparatus 10 according to the embodiment may compare a conceptual drawing (reference image) of the external appearance or the like of the building, which is based on three-dimensional design data generated by software for computer design, with a real image of the actually completed building, and may detect the presence or absence of a defect in accordance with the reliability of the conceptual drawing.

For example, if the reliability of the conceptual drawing is a threshold or more, the detection unit 106 may determine the presence of a defect and may detect a defect position, and the display unit 108 may present information relating to the defect position. On the other hand, if the reliability of the conceptual drawing is less than the threshold, the detection unit 106 may determine the absence of a defect. Note that the display unit 108 may present to the user a 1.5 message that a defect is not determined since the reliability is less than the threshold.

Besides, in addition to design data which defines the structure of the first inspection target, a first design image may be generated, to which information of material relating to, for example, a wooden construction or a reinforced concrete construction, and information of a color such as a color of walls, are added.

Specifically, the processing of the defect classification apparatus 10 according to the embodiment is applicable to any product or structure, which is made based on data generated by software for computer design.

Figure 9:
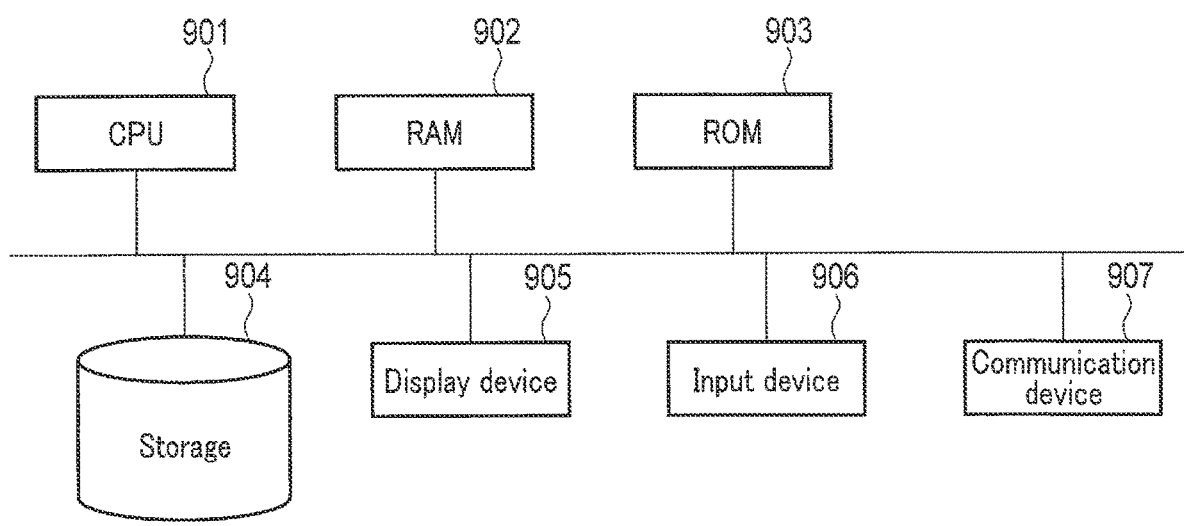
FIG. 9 is a view illustrating an example of a hardware configuration of the defect classification apparatus.

Next, FIG. 9 illustrates an example of a hardware configuration of the defect classification apparatus 10 according to the above embodiment.

The defect classification apparatus 10 includes a CPU (Central Processing Unit) 901, a RAM (Random Access Memory) 902, a ROM (Read Only Memory) 903, a storage 904, a display device 905, an input device 906 and a communication device 907, and these components are connected by a bus.

The CPU 901 is a processor which executes an arithmetic process and a control process, or the like according to programs. The CPU 901 uses a predetermined area of the RAN 902 as a working area, and executes various processes relating to each unit of the defect classification apparatus 10 in cooperation with programs stored in the ROM 903 and storage 904, or the like.

The RAM 902 is a memory such as an SDRAM (Synchronous Dynamic Random Access Memory). The RAM 902 functions as the working area of the CPU 901. The ROM 903 is a memory which stores programs and various information in a non-rewritable manner.

The storage 904 is a device which writes and reads data to and from a magnetic recording medium such as an HDD, a semiconductor storage medium such as a flash memory, a magnetically recordable storage medium such as an HDD (Hard Disc Drive), or an optically recordable storage medium. The storage 904 writes and reads data to and from the storage medium in accordance with control from the CPU 901.

The display device 905 is a display device such as an LCD (Liquid Crystal Display). The display device 905 displays various information, based on a display signal from the CPU 901.

The input device 906 is an input device such as a mouse and a keyboard, or the like. The input device 906 accepts, as an instruction signal, information which is input by a user's operation, and outputs the instruction signal to the CPU 901.

The communication device 907 communicates, via a network, with an external device in accordance with control from the CPU 901.

According to the above-described embodiment, when a reference image, which becomes a mask image of an inspection target in a case where there is no defect based on a first design image, is generated, the reliability of the reference image is calculated on a pixel by pixel basis, and a defect of the inspection target is classified according to the reliability. Thereby, for example, if the reliability of the reference image is low, it can be determined, for example, that there is a possibility that a defect detected by the reference image is a pseudo-defect. Thus, defect classification can be performed according to the reproducibility of the reference image, and the precision in classification can be improved.

The instructions indicated in the processing procedure illustrated in the above embodiment can be executed based on a program that is software. A general-purpose computer system may prestore this program, and may read in the program, and thereby the same advantageous effects as by the control operation of the above-described defect classification apparatus can be obtained. The instructions described in the above embodiment are stored, as a computer-executable program, in a magnetic disc (flexible disc, hard disk, or the like), an optical disc (CD-ROM, CD-R, CD-RW, DVD-ROM, DVD±R, DVD±RW, Blu-ray (trademark) Disc, or the like), a semiconductor memory, or other similar storage media if the storage medium is readable by a computer or an embedded system, the storage medium may be of any storage form. If the computer reads in the program from this storage medium and causes, based on the program, the CPU to execute the instructions described in the program, the same operation as the control of the defect classification apparatus of the above-described embodiment can be realized. Needless to say, when the computer obtains or reads in the program, the computer may obtain or read in the program via a network.

Additionally, based on the instructions of the program installed in the computer or embedded system from the storage medium, the OS (operating system) running on the computer, or database management software, or MW (middleware) of a network, or the like, may execute a part of each process for implementing the embodiment.

Additionally, the storage medium in the embodiment is not limited to a medium which is independent from the computer or embedded system, and may include a storage medium which downloads, and stores or temporarily stores, a program which is transmitted through a LAN, the Internet, or the like.

Additionally, the number of storage media is not limited to one. Also when the process in the embodiment is executed from a plurality of storage media, such media are included in the storage medium in the embodiment, and the media may have any configuration.

Note that the computer or embedded system in the embodiment executes the processes in the embodiment, based on the program stored in the storage medium, and may have any configuration, such as an apparatus composed of any one of a personal computer, a microcomputer and the like, or a system in which a plurality of apparatuses are connected via a network.

Additionally, the computer in the embodiment is not limited to a personal computer, and may include an arithmetic processing apparatus included in an information processing apparatus, a microcomputer, and the like, and is a generic term for devices and apparatuses which can implement the functions in the embodiment by programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the in

What is claimed is:

1. A defect classification apparatus comprising a processor configured to:
   acquire a first design image which is an image created by design software based on design data and which relates to a first inspection target;
   acquire a first real image which is an image captured by imaging the first inspection target as actually produced based on the design data;
   convert the first design image to a reference image by using a second real image, the reference image being a generated image representing an inspection target having no defect, and the second real image being an image captured by imaging at least a part of a second inspection target which is an actually produced inspection target having no defect;
   calculate a reliability of the reference image based on a similarity between design images of the first inspection target and the second inspection target;
   detect a defect in the first inspection target by comparing the reference image and the first real image; and
   classify the defect, based on the calculated reliability of the reference image.

2. The apparatus according to claim 1, wherein:
   a second real patch image, which is a partial image of the second real image, is associated with a second design patch image which is a partial image of a second design image based on design data relating to the second inspection target,
   the processor generates the reference image by pasting the second real patch image associated with the second design patch image, which is similar to a first design patch image that is a partial image cut out from the first design image, to a cut-out position of the first design patch image, such that the second real patch image corresponds to the cut-out position of the first design patch image, and
   the processor sets a reliability of the cut-out position such that the reliability increases in accordance with an increase in a similarity between the first design patch image and the second design patch image.

3. The apparatus according to claim 2, wherein the similarity is set to increase in accordance with a decrease in a difference between the first design patch image and the second design patch image.

4. The apparatus according to claim 2, wherein the similarity is set to increase in accordance with an increase in a value of a normalized cross-correlation between the first design patch image and the second design patch image.

5. The apparatus according to claim 2, wherein the processor calculates, at a pixel position where a plurality of second real patch images are superimposed, a statistic relating to the similarity between the first design patch image and each of the plurality of second design patch images, as a reliability of the pixel position.

6. The apparatus according to claim 1, wherein the processor compares the reference image and the first real image and detects, as the defect, a region of a pixel at which a difference between the reference image and the first real image is at least a threshold, and acquires (i) a position of the defect and (ii) the reliability of the reference image corresponding to the position of the defect.

7. The apparatus according to claim 6, wherein the processor detects the position of the defect based on pixel values of images acquired by normalizing the reference image and the first real image.

8. The apparatus according to claim 1, wherein the processor classifies a type of a defect relating to the first real image by inputting the first real image, a position of the defect, and corresponding reliability to a trained model, the trained model being trained so as to accept input of an image with a defect and a corresponding reliability and to output a type of the defect.

9. The apparatus according to claim 1, wherein the processor classifies the defect as a pseudo-defect when the reliability corresponding to a position of the defect is less than a threshold.

10. The apparatus according to claim 1, wherein the processor displays a position of the defect and a type of the defect on the first real image.

11. A defect classification method comprising:
    acquiring a first design image which is an image created by design software based on design data and which relates to a first inspection target;
    acquiring a first real image which is an image captured by imaging the first inspection target as actually produced based on the design data;
    converting the first design image to a reference image by using a second real image, the reference image being a generated image representing an inspection target having no defect, and the second real image being an image captured by imaging at least a part of a second inspection target which is an actually produced inspection target having no defect;
    calculating a reliability of the reference image based on a similarity between design images of the first inspection target and the second inspection target;
    detecting a defect in the first inspection target by comparing the reference image and the first real image; and
    classifying the defect, based on the calculated reliability of the reference image.

12. A non-transitory computer readable medium including computer executable instructions, wherein the instructions, when executed by a processor, cause the processor to perform processes comprising:
    acquiring a first design image which is an image created by design software based on design data and which relates to a first inspection target;
    acquiring a first real image which is an image captured by imaging the first inspection target as actually produced based on the design data;
    converting the first design image to a reference image by using a second real image, the reference image being a generated image representing an inspection target having no defect, and the second real image being an image captured by imaging at least a part of a second inspection target which is an actually produced inspection target having no defect;
    calculating a reliability of the reference image based on a similarity between design images of the first inspection target and the second inspection target;
    detecting a defect in the first inspection target by comparing the reference image and the first real image; and
    classifying the defect, based on the calculated reliability of the reference image.

* * * * *